United States Patent [19]
Perkola et al.

[11] Patent Number: 4,877,424
[45] Date of Patent: Oct. 31, 1989

[54] METHOD AND APPARATUS FOR SEPARATING SOLIDS FROM A SOLIDS-GAS MIXTURE

[76] Inventors: Markku Perkola, 35 Walker La., Glens Falls, N.Y. 12801; Ilkka Seppa, 261 Blackberry Hill Dr., Wakefield, R.I. 02879

[21] Appl. No.: 160,669

[22] Filed: Feb. 26, 1988

[51] Int. Cl.⁴ .......................................... B01D 19/00
[52] U.S. Cl. ............................................ 55/52; 55/199
[58] Field of Search ................... 55/52, 199, 398; 415/143, 170 B

[56]  References Cited
U.S. PATENT DOCUMENTS

| | | | |
|---|---|---|---|
| 2,439,577 | 4/1948 | Norton | 103/113 |
| 2,575,568 | 11/1951 | Topanelian | 55/199 |
| 4,273,562 | 6/1981 | Niskanen | 55/52 |
| 4,362,536 | 12/1982 | Gullichsen | 55/52 |
| 4,410,337 | 10/1983 | Gullichsen et al. | 55/52 X |

*Primary Examiner*—Charles Hart
*Attorney, Agent, or Firm*—Cohen, Pontani & Lieberman

[57] ABSTRACT

Apparatus and method for degasifying a gas and solids containing flowable material includes an inlet for the flowable material and an outlet for gas separated from the flowable material. A fluidizing rotor has radially extending open blades and is disposed for driven rotation about its center for generating a degasifying centrifugal force and has a substantially disk-shaped radially extending back plate, the back plate has a front side and a rear side, a plurality of air passages defined in and through the back plate and through which gas separated from the flowable material travels from the front side to the rear side of the back plate for discharge through the outlet. The passages extend from the front to the rear side of the back plate in a direction angled radially inwardly in the direction of flow and toward the center of the rotor and counter to the centrifugal forces generated by the rotating rotor, and the outlet is located behind the back plate and in fluid communication with the air passages to permit the separated air to travel therethrough.

21 Claims, 1 Drawing Sheet

U.S. Patent  Oct. 31, 1989  4,877,424
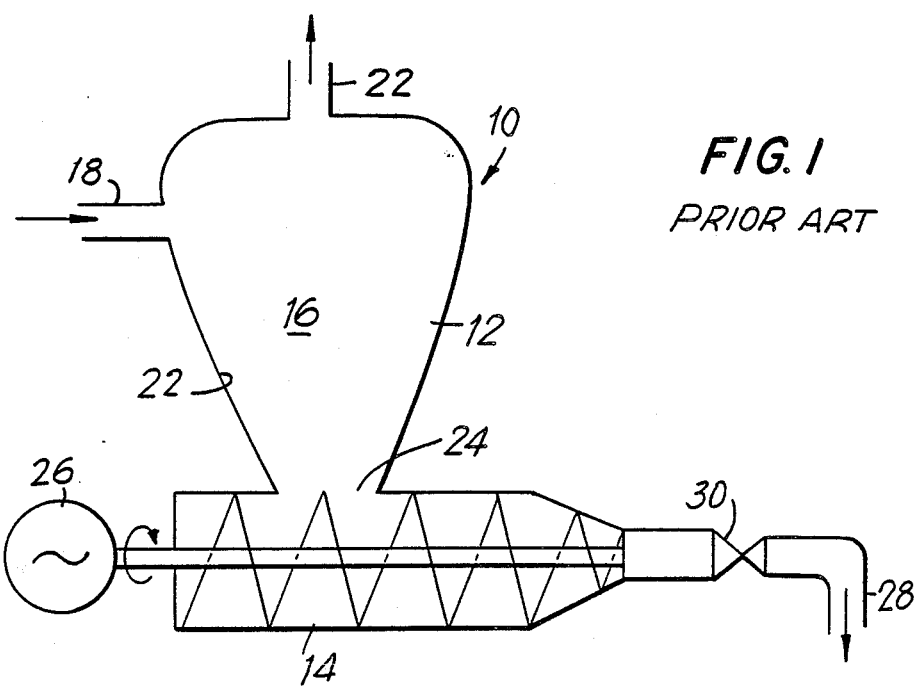
FIG. 1 PRIOR ART
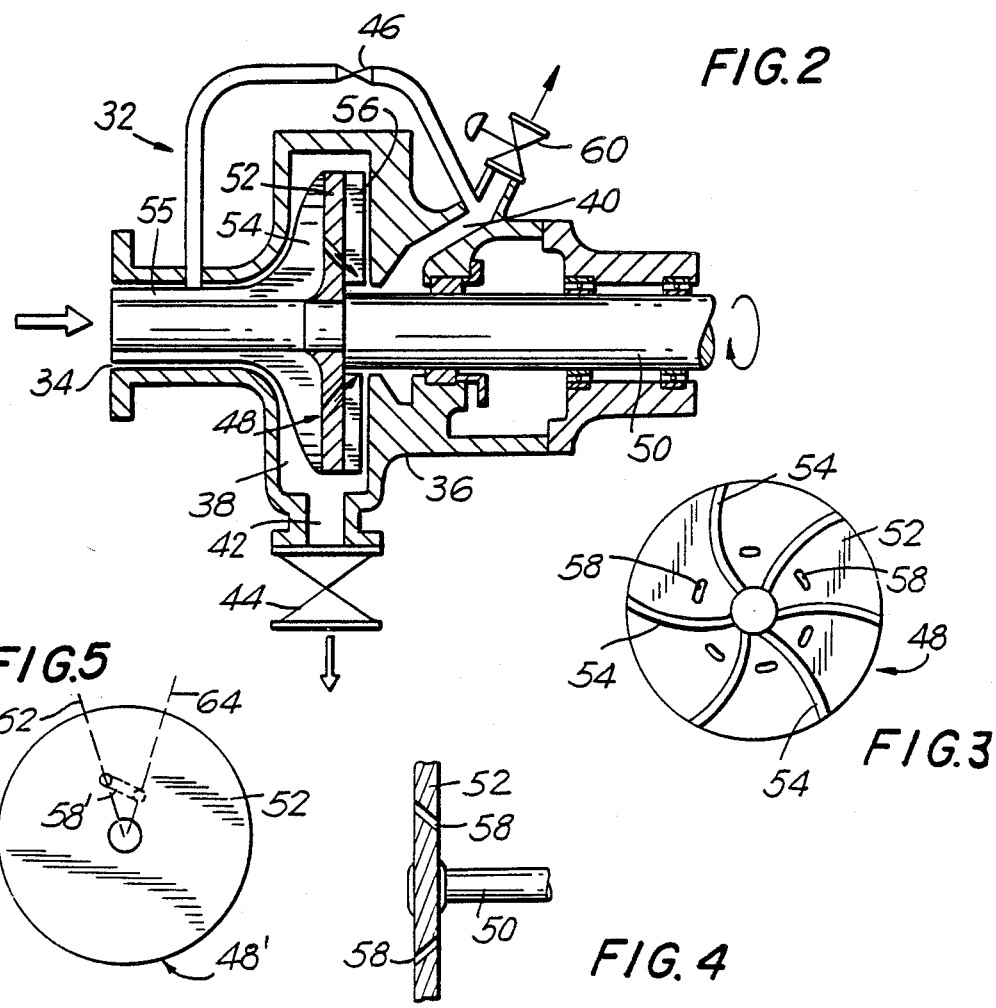
FIG. 2
FIG. 3
FIG. 5
FIG. 4

METHOD AND APPARATUS FOR SEPARATING SOLIDS FROM A SOLIDS-GAS MIXTURE

FIELD OF THE INVENTION

The present invention relates to improvements in the processing of pulp in pulp treatment and paper-making plants. The invention is more particularly directed to a method and apparatus for efficiently and effectively separating steam or gas from a pressurized flowable mixture of pulp and steam or gas in the paper-making process.

BACKGROUND OF THE INVENTION

In paper-making processes and mills it is necessary to move the pulp-fiber suspension between various treatment stations and apparatus. With increasing consistency the viscosity of the pulp-fiber suspension renders the mixture more and more difficult to pump or transport from one treatment station to another. It is accordingly known to fluidize the pulp-fiber suspension by mixing it with relatively high pressure steam or gas by which the mixture is more readily transported. In feeding a pulp-fiber suspension to a centrifugal pump, for example, a mixture of pressurized steam and pulp is far more readily transportable than the high consistency pulp alone as the fluidizing steam or gas carries the fiber content into the pump toward the pump impeller.

Various processes involved in the treatment of pulp during or in connection with the manufacture of paper require the discharge of pulp—e.g. wood fibers—from a pressurized vessel or condition in which the pulp has been separated from pressurized steam or gas to a relatively lower or ambient pressure vessel or environment. Alternatively but less often the pulp may be discharged to a high pressure from a relatively lower pressure environment. The dry-substance content of the pulp in these instances is typically, although not exclusively, in the range of approximately 15% to 50%. In such processes, it is important that the pulp be discharged without an accompanying discharge of the gaseous pressurized medium—i.e. the steam or gas. Processes of this kind include thermo-mechanical pulping, pressure refiner mechanical pulping, chemi-thermo mechanical pulping, pressure ground wood and pulp digestion processes.

Separation of the high consistency pulp-fibers from the gaseous pressurized medium has heretofore been carried out through the use of a cyclone, wherein the separation or degasification of the mixture is effected, in combination with discharging apparatus such, for example, as a plug screw, a high-consistency pump or a pocket discharger for carrying away the separated pulp. The use of these combinations of apparatus, however, involves serious disadvantages including significant space requirements which impose severe limitations on the layout of the paper-making mill, the substantial expense of their construction, their high consumption of energy and the undesired passage or leakage of pressurized steam or gas through the pulp discharger together with the separated solids.

OBJECTS OF THE INVENTION

It is accordingly the desideratum of the present invention to provide an improved method and apparatus for efficiently and effectively separating, from a mixture of pressurized gas or steam and medium-to-high consistency pulp-fiber suspension, the pulp from the gaseous pressurized medium.

It is a further object of the invention to provide such an improved method and apparatus which is particularly effective in preventing leakage or discharge of the pressurized gaseous medium with the separated and discharged pulp.

It is another object of the invention to provide such an improved method utilizing an apparatus that is relatively small in size and is readily manufacturable at substantially reduced cost with respect to prior art apparatus.

Further objects, features and advantages of the present invention will be more fully appreciated by reference to the following detailed description of a presently preferred, but nonetheless illustrative, embodiment in accordance with the present invention when taken in conjunction with the accompanying drawings.

BRIEF DESCRIPTION OF THE DRAWINGS

In the drawings, wherein similar reference characters denote similar elements throughout the several views:

FIG. 1 is a cross-sectional diagrammatic side view of a prior art apparatus for separating pulp-fibers from the gaseous pressurized fluidizing medium;

FIG. 2 is a cross-sectional side view of a centrifugal pump-type apparatus for separating pulp-fibers from the gaseous pressurized medium in accordance with the present invention;

FIG. 3 is an elevated front face view of a rotor for use in the pump apparatus of FIG. 2;

FIG. 4 is an elevated side view, in cross section, of a portion of the back plate of a rotor for use in the pump apparatus of FIG. 2 in accordance with a particular feature and preferred embodiment of the invention; and FIG. 5 is a front face view of a modified pump rotor in accordance with the invention.

DETAILED DESCRIPTION OF THE PREFERRED EMBODIMENT

Turning now to the drawings, there is shown in FIG. 1 a prior art discharger apparatus, identified by the general reference numeral 10, typically incorporated in a pulp treatment system for separating pulp solids from a mixture of pulp and pressurized steam or gas which is fed or transported to the apparatus. The apparatus 10 consists of the combination of a conventional cyclone 12 in which the pulp and gas are centrifugally separated and a plug or block screw 14 for transporting or discharging the separated pulp therefrom. The mixture of the pulp-fiber suspension and pressurized steam or gas is fed into the interior 16 of cyclone 12 through inlet 18. The cyclone interior is typically pressurized at about 30 to 45 psi. A high speed rotational velocity is imparted to the solids-gas mixture in the cyclone and the centrifugal force so generated effects separation of the pulp and gas as the relatively heavy pulp, and to a far lesser—indeed almost negligible—extent the significantly lighter steam or gas, is thrown or displaced to the periphery of the cyclone interior. The downwardly and inwardly tapered configuration of the cyclone peripheral wall 20 causes the radially outwardly displaced pulp to move to the bottom of the cyclone. The separated steam or gaseous medium, on the other hand, is substantially unaffected by the radially-outwardly directed centrifugal force and passes upwardly to gas outlet 22 for discharge from the apparatus 10.

A pulp or solids outlet 24 is defined at the bottom of cyclone 12 and the screw-type discharger 14 is disposed at or proximate outlet 24 for receiving the separated pulp fiber solids which have been centrifugally separated from the steam-pulp mixture. Screw 14 is operatively rotated by a motor 26 and transports the pulp fibers to discharge outlet 28 through optional outlet control valve 30. The pulp thus discharged from apparatus 10 may next, for example, be fed to a washer or other treatment apparatus or process in the paper-making operation.

As previously described, prior art separating apparatus such as that illustrated by way of example in FIG. 1, and their use, present serious drawbacks. The cyclones are large, typically measuring about 3 by 5 meters, and when constructed in combination with screw-type or other solids dischargers 14 thus impose severe limitations on the layout of pulp processing and paper-making mills. Furthermore, in addition to their high construction costs and substantial consumption of energy, in operation they permit not inconsequential amounts of the gaseous medium to be discharged with the pulp fibers, often necessitating further degasification of the output pulp prior to its additional processing or treatment of the pulp.

An apparatus in accordance with the present invention and which overcomes the drawbacks of prior art constructions is shown in FIG. 2. The invention contemplates the use of a generally but not entirely conventional centrifugal pump 32 having an inlet 34 into which the mixture of pressurized steam or gas and pulp-fiber solids is fed. It should at the outset be noted and understood that although prior art centrifugal pumps similar to that illustrated in FIG. 1 have heretofore been used in the degasification of liquid-pulp suspensions, generally in conjunction with an external source of vacuum, their use with wood pulp of medium-to-high consistency and thus of substantial viscosity, particularly when the pulp is mixed with pressurized steam or gas (for example to permit its ready transport or flow), has not previously been known or practiced. This new use of centrifugal pumps is one aspect of the present invention. In any event, centrifugal pump 32 includes a housing 36, an interior cavity 38 in communication with inlet 34, a steam or gas outlet 40 which communicates with interior cavity 38, a pulp outlet conduit 42 and associated adjustable valve 44, and a pressure differential control valve 46 connected between pump inlet 34 and gas outlet 40. Pump 32 further incorporates a rotor 48 disposed in interior cavity 38 and mounted for driven rotation on a shaft 50.

As shown in FIG. 3, rotor 48 includes a main or face or back plate 52 and a plurality of blades 54 on the front or upstream side of plate 52 for imparting the desired high speed rotational velocity component to the pulp and steam or gas mixture as it enters pump 32 through inlet 34. Blades 54 may be of generally conventional form although, in the embodiment shown in FIG. 2, they are elongated and extend forwardly toward pump inlet 34 so as to form wing-like extensions 55. Wings 55 are not, however, necessary to the method, apparatus or practice of the invention. The rotor may also be provided with back vanes 56, which again may be of generally conventional form, for returning to the upstream side of plate 52 any pulp fiber solids that are drawn or otherwise carried behind rotor 48. Additionally defined in and about or proximate the center or hub 52 of plate 52 of the rotor are a plurality of passages or through-bores 58 which may have any of a variety of cross-sectional configurations such, for example, as the generally arcuate shape seen in FIG. 3.

In use, the mixture of pressurized steam or gas and pulp fibers flows or is fed or transported into the pump through its inlet 34. The shear forces created by the rotation of rotor 48 as the gas-solids mixture contacts wings 55 of rotor blades 54 fluidize the pulp and the centrifugal forces which are generated separate the steam or gas from the solid material. The relatively heavy solids—i.e. the pulp fibers—are thrown radially outward against the interior walls of the pump housing and move downward into outlet conduit 42. Adjustment of valve 44 in conduit 42 permits controlled discharge of the separated pulp solids from the pump as appropriate.

Indeed, one feature of the present invention lies in the fact that the pressure of the environment to which the separated solids are discharged through outlet conduit 42 is substantially independent of the pressure of the gas-solids mixture fed to the pump through inlet 34 and the pressure in the pump housing 36 on the upstream side of the rotor. In most cases it is contemplated that the separated solids will be discharged through outlet conduit 42 to an environment at a lower—as, for example, atmospheric or gas-solids mixture. It is also, however, within the scope and intention of the invention that solids be discharged through outlet 42 to a higher pressure environment or vessel. Appropriate dynamic adjustment of valve 44 may be used to facilitate this transition.

The centrifugal forces generated by the spinning rotor have little effect on the lightweight steam or gas separated from the input mixture and such gases remain generally about the central portion of the rotor. Those of ordinary skill in the art will recognize that the fluidizing of the gas-solids mixture also effects the separation of entrained air and bubbles from the pulp which, likewise, remain about the central portion of rotor 48. Because gas outlet 40 is typically arranged in communication either with the ambient atmosphere or with an environment at atmospheric or at least relatively low pressure with respect to the pressure at pump inlet 34, the pressure differential between pump inlet 34 and gas outlet 40, and consequently between the front and back sides of rotor 48, causes the steam or gas and/or air separated from the gas-solids mixture to be drawn from the upstream side of the rotor, through rotor passages 58 and outwardly from pump 32 through gas outlet 40. Valve 46 is adjustable for selectively controlling and, as generally contemplated, for maintaining a substantially constant predetermined or dynamically-adjustable pressure drop or differential between the gas-solids pump inlet 34 and the gas discharge outlet 40. This pressure differential is typically on the order of at least about 5 psi. By reason of this pressure differential, there is no need to employ any external or other supplemental vacuum-generating apparatus in association with pump 32 for effecting removal and discharge of the separated gases. An additional valve 60 may also be provided in the conduit of outlet 40 for further adjustably controlling the discharge of pressurized gas or steam from pump 32.

Although use of the centrifugal pump 32 as thus far disclosed provides unusually enhanced and heretofore unattained operating effectiveness, efficiency and flexibility in separating pulp fiber solids from the gaseous pressurized transport/fluidizing medium and for avoiding undesired discharge of gases with the pulp solids, it is recognized that the gases drawn through rotor passages or throughbores 58 will sometimes carry with them pulp fibers which can clog the passages and thus interfere with, or even prevent, the proper and efficient operation of the pump. Such drawing of pulp fibers through the rotor passages is also known to occur in the prior art use of known centrifugal pumps with relatively low consistency pulp fiber suspensions—which suspensions are readily flowable and thus transportable without the addition of fluidizing steam and gases. Indeed, the inclusion of back vanes 56 on conventional centrifugal pump rotors or impellers is at least partly a response to the problem of solid fibers which have passed or been drawn through the rotor openings or passages to the back or downstream side of the rotor and must be returned to the front side of the rotor to prevent their discharge into the atmosphere or the like through the gas outlet 40. This flow of solids through the rotor passages often merely decreases the operating efficiency of the pump since the solids must be returned to the upstream side of the rotor but can also cause a complete breakdown in the operation of the pump when the solids clog and block the rotor passages.

The present invention accordingly provides an elegant and effective solution to this problem. In a particularly preferred form of the pump 32, the passages through rotor 48 are angled radially inwardly against or counter to the rotor-generated centrifugal force, toward the center or hub of the rotor, as they extend from the upstream to the downstream side of the rotor plate 52. Put another way, each of the throughbores or gas flow passages 58 starts at the front or upstream side of rotor plate 52 a distance "x" from the center or hub of the plate, and ends at the rear or downstream side of the rotor plate a distance "y" from the plate hub, distance "y" being less than distance "x". A cross-sectional representation of a portion of the back plate 52 of such an improved rotor 48, illustrating representative angularly-oriented gas passages 58, is shown in FIG. 4. Various angles for passages 58—i.e. various differences between the distances "x" and "y"—may be employed within the scope and contemplation of the invention.

It is also contemplated that, in a modified rotor, the passages extend not only radially-inward from front to back but, in addition, at an angle to the radial direction—i.e. between two spaced apart radii of the rotor plate. In FIG. 5, for example, the single passage 58' shown by way of example (the remaining passages about the rotor hub are omitted solely for convenience of illustration, as are the rotor blades 54) in rotor plate 52 extends both radially inward and between the two spaced apart radii 62, 64. It is preferred that the passages 58' are angled against the direction of rotor rotation, as indicated in FIG. 5.

Operation of the centrifugal pump 32 having a rotor incorporating angled gas flow passages 58 is almost precisely the same as that previously described. The primary difference is that the relatively light-weight steam, air and/or gases will still freely flow or be drawn by the pressure differential through the radially-inwardly angled passages 58, against the radially-outward centrifugal forces generated by rotation of the rotor 48. The significantly heavier solids, on the other hand, will generally be prevented from entering, flowing through or clogging the angled passages 58 because the radially-outwardly directed centrifugal force throws the solids away from and in a direction generally opposite or counter to the radially-inwardly directed throughbores 58. To the extent that any solid materials do enter and flow through the angled passages, those particles will necessarily be so light, and consequently small, as to virtually assure that they will neither remain in nor clog the passages, and will in any event be returned by the back vanes 56 to the upstream side of the rotor.

There has accordingly herein been disclosed an improved method and apparatus for separating, from a mixture of pressurized steam or gas and pulp fiber solids, the pulp from the gas and/or steam. Of course, the invention is more broadly applicable to the separation of the gases and solids from any gas-solids mixture supplied under pressure. Indeed, at least some aspects of the invention, such as the provision of radially-inwardly angled passages in the rotor or impeller of a centrifugal pump, may be applied to the degasification or component separation of mixtures supplied not under substantial pressure but, rather, pumped or otherwise fed into the pump inlet including, by way of example, relatively low consistency liquid-pulp suspensions and the like. The advantages of the method and apparatus of the invention are thus applicable to a broad range of structures, uses and implementations and the invention so contemplates.

While there have been shown and described and pointed out fundamental novel features of the invention as applied to a preferred embodiment thereof, it will be understood that various omissions and substitutions and changes in the form and details of the device illustrated and in its operation, and in the method described, may be made by those skilled in the art without departing from the spirit of the invention. It is the intention, therefore, to be limited only as indicated by the scope of the claims appended hereto.

What is claimed is:

1. In a centrifugal pump of use in the degasification of a gas and solids containing flowable material and including an inlet for the flowable material and an outlet for gas separated from the flowable material, a fluidizing rotor having radially extending open blades and being disposed for driven rotation about its center for generating a degasifying centrifugal force and having a substantially disk-shaped radially extending back plate, said back plate having a front side and a rear side, a plurality of air passages defined in and through said back plate and through which gas separated from the flowable material travels from the front side to the rear side of said back plate for discharge through said outlet, said passages extending from said front and said rear side of the back plate in a direction angled radially inwardly in the direction of flow and toward the center of said rotor and counter to the centrifugal forces generated by the rotating rotor; and said outlet being located behind the back plate and in fluid communication with said air passages for permitting the separated air to travel therethrough.

2. In a centrifugal pump in accordance with claim 1, wherein said passages extend from said front to said rear side of the rotor in a direction angled both radially inwardly toward the center of said rotor and between two spaced apart radii of said rotor.

3. In a centrifugal pump in accordance with claim 1, wherein the flowable material is supplied to the pump inlet at one pressure, further comprising outlet means through which solids separated from the flowable material in said pump are discharged at a second pressure.

4. In a centrifugal pump in accordance with claim 3, wherein said first pressure is greater than said second pressure 5. In a centrifugal pump in accordance with claim 4, wherein said second pressure is substantially atmospheric pressure.

6. In a centrifugal pump in accordance with claim 3, wherein said second pressure is greater than said first pressure.

7. In a centrifugal pump in accordance with claim 1, wherein the flowable material is a mixture of medium-to-high consistency solids and pressurized gas, further comprising outlet means through which the pulp separated from the flowable material is discharged at a pressure substantially less than the pressure of the flowable material supplied at the pump inlet.

8. A method for degasifying a solids-containing flowable material, comprising the steps of:
   feeding the flowable material to a centrifugal pump through a pump inlet;
   providing a centrifugal force-generating fluidizing rotor having a substantially disk-shaped radially extending back plate, said back plate having a front side and a rear side, radially extending open blades attached to said front side, a plurality of through passages defined in and through said back plate, said passages extending from said front to said rear side of said back plate and in a direction angled radially inwardly in the direction of flow and toward the axis of rotation of said rotor and counter to the generated centrifugal force; and
   providing a pressure differential between the pump inlet and a gas outlet of the pump;
   causing gas separated from the flowable material to be drawn by the pressure differential through said passages against the centrifugal force;
   discharging the separated gas through the gas outlet while minimizing the flow through said passages of solids separated from the flowable material.

9. A method in accordance with claim 8, said flowable material being fed to the centrifugal pump at a pressure greater than the pressure at the gas outlet.

10. A method in accordance with claim 8, wherein the pressure at the gas outlet is less than the pressure at the pump inlet.

11. A method in accordance with claim 8, further comprising applying to the gas outlet a pressure less than the pressure at the pump inlet.

12. A method in accordance with claim 8, further comprising the step of discharging from the pump through a mass outlet solids separated from the flowable material.

13. A method in accordance with claim 12, wherein said flowable material is fed to the pump at a first pressure and the separated solids are discharged through the mass outlet at a second pressure less than said first pressure.

14. A method in accordance with claim 12, wherein said flowable material is fed to the pulp at a first pressure and the separated solids are discharged through said mass outlet at a second pressure greater than said first pressure.

15. A method of separating the gas and solids of a pressurized solids-gas mixture, comprising the steps of:
   feeding the pressurized mixture to a separating apparatus;
   rotating a fluidizing rotor in the apparatus to generate a degasifying centrifugal force applied to the pressurized mixture, said rotor having a back plate with radially extending open blades;
   providing a gas outlet at a pressure less than the pressure of the mixture for including the flow through the outlet of gas separated from the mixture by the centrifugal force; and
   providing a plurality of passages in and through said rotor through which the separated gas must pass to reach the gas outlet, said passages extending from the front side to the rear side of said back plate and being angled in a direction radially inwardly in the direction of flow and towards the axis of rotation of said rotor and counter to the centrifugal force to minimize the passage of solids separated from said mixture through said passages.

16. In a method in accordance with claim 15, further comprising discharging solids separated from the mixture through a solids outlet in the apparatus.

17. In a method in accordance with claim 16, further comprising maintaining the solids outlet at a pressure less than the pressure of the mixture.

18. In a method in accordance with claim 15, wherein the separated solids are discharged through the solids outlet to a pressure less than the pressure of the mixture.

19. In a method in accordance with claim 15, wherein the separated solids are discharged through the solids outlet to a pressure greater than the pressure of the mixture.

20. In a method in accordance with claim 15, wherein the rotor is rotated about an axis, further comprising defining the passages in the rotor so that they extend in a direction substantially toward the axis.

21. A method in accordance with claim 15, wherein the rotor is rotated about an axis, further comprising defining the passages in the rotor so that they extend in a direction both radially inwardly toward the axis and between two radii extending radially outward from the axis.

* * * * *